March 9, 1937.  H. SCHARLAU  2,073,352
ADJUSTABLE DIRECTION FINDER CHART
Filed June 14, 1933
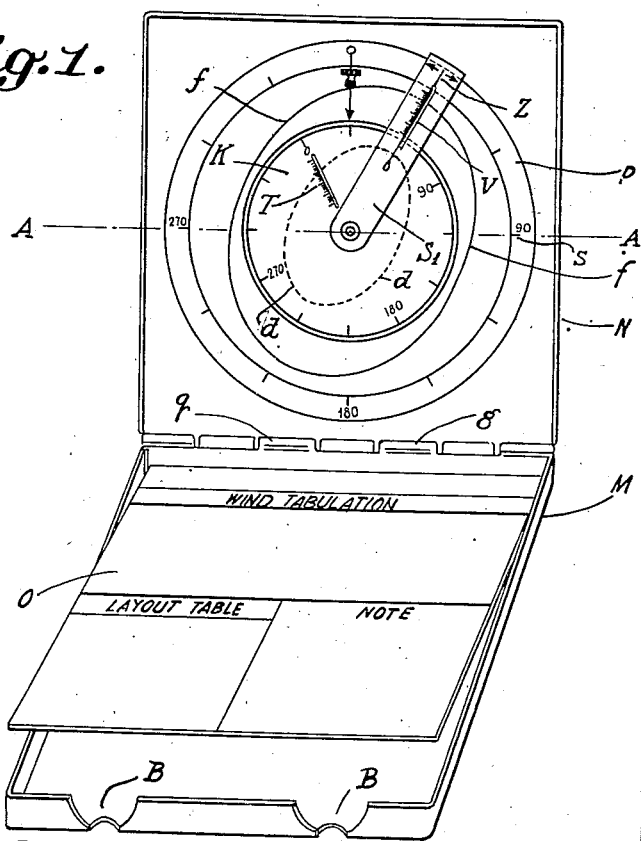
Fig. 1.
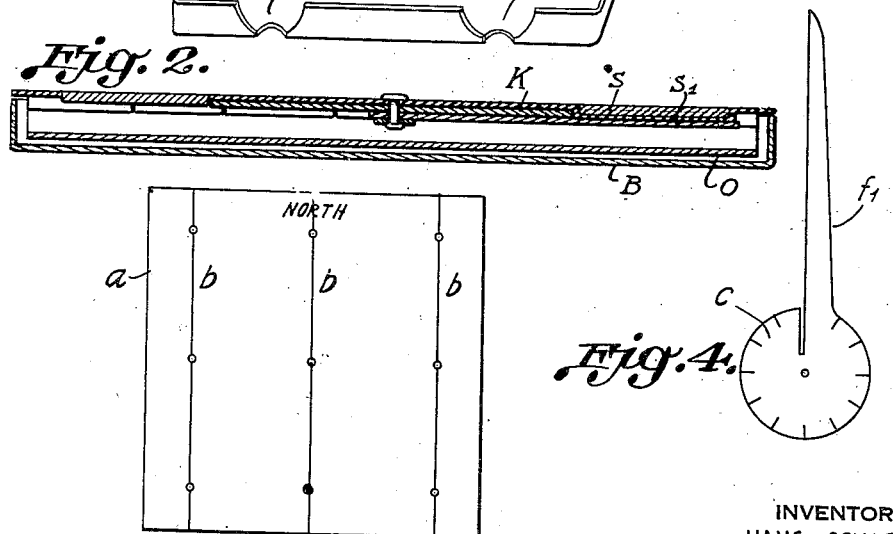
Fig. 2.
Fig. 3.
Fig. 4.
INVENTOR
HANS SCHARLAU
ATTORNEY

UNITED STATES PATENT OFFICE 2,073,352

ADJUSTABLE DIRECTION-FINDER CHART

Hans Scharlau, Berlin, Germany, assignor to Telefunken Gesellschaft fur Drahtlose Telegraphie m. b. H., Berlin, Germany, a corporation of Germany Application June 14, 1933, Serial No. 675,773
In Germany June 15, 1932

7 Claims. (Cl. 33—76)

This invention relates to an improved outfit for the mechanical evaluation of radio direction-findings for non-stationary direction-finding stations, particularly aircraft.

In direction-finding work on small craft, especially aerial craft, the personnel in charge of such work generally has not sufficient opportunity to determine locations by the values directly read from the direction-finding apparatus with convenient accuracy. Inasmuch as the operator's mind is occupied by other activities, relative to the operation of the aircraft, it is desirable to relieve the operators of all tedious calculations and the manipulation of cumbersome apparatus on large-sized maps. The evaluation of direction-finding figures should as far as possible be by mechanical methods using the simplest possible devices requiring a minimum amount of space.

The corrections to be made in the indications of direction of the radio-goniometer and of the compass as a general rule are as follows:

The apparent direction of the radio beacon as given by the radio direction-finder ordinarily contains an error due to the influence (re-radiation) of electrically conducting parts of the vessels or craft. These errors which are known as the quadrantal errors are found from tabulations compiled for the aircraft in question by practical measurements.

Also the readings of the compass fail to give the true direction of the geographic meridian and require two different corrections: one which is known as the magnetic deviation or variation wherein the angle by which, in the region in question, the direction of the magnetic meridian deviates from the geographic meridian; while the second correction refers to the deviation angle, i. e., the deviation of the compass needle from the magnetic meridian under the influence of ferro-magnetic objects located nearby. If the corrections are taken in consideration and the radio beacons of two known transmitters located at certain points on a map with the geographic meridian of the aircraft ascertained, then, it will be possible to directly determine the location or bearing of the craft.

Now, in view of the particular difficulties of a small aircraft, it is of extremely great importance to obtain a rapid and exact evaluation of the direction-finding figures by the personnel in charge of such work so that they will be saved all complicated and tedious work both manual and mental. Another desideratum is that the devices so to be used are stable, require a minimum of space, consist of weather-proof material that will not be impaired or damaged by moisture, rain, and substances as used for operating the craft, such as benzin, oil, etc.

Now, all of these requirements are fulfilled by the present invention. The device consists of a shallow box built from a material possessing both mechanical strength and weather-proof properties in which are contained the following articles, to wit:

(a) Stationarily fixed is a computing circle or dial with all of the necessary corrections and the rotatable scales pertaining thereto, with indices for reading the direction in reference to the beacon on a map by the aid of loxodromic or orthodromic lines according to the projection system of the map, in the light of direction-finding data.

(b) A set of instruments made of transparent material for evaluating the radio direction-finding data mentioned in (a) on maps, the same comprising a plate with meridian lines and a protractor integral with a ruler.

(c) Fixedly or rotatably disposed in the case are: a writing pad or plate containing printed nautic tabulations regarding the effects of wind and current as well as a schema or blank space for notes covering the same.

The material of this outfit further has the property that some or all of the surfaces may be written upon with any desired writing substance such as lead pencil, copying or indelible pencil, crayon, ink, paint, India ink, etc., and that such writing without an incidental damage may be removed again with an eraser, water, benzin, or alcohol.

An embodiment of such an outfit is shown in the attached drawing by way of example in which—

Fig. 1 shows a perspective view of the adjustable direction finder chart with the cover open;

Fig. 2 is a section through the device, the section being taken on line A—A with the cover closed;

Fig. 3 is a plan view of a transparent plate having located thereon a number of meridian lines;

Fig. 4 is a plan view of a protractor having an extension which forms a ruler.

Referring now in detail to Fig. 1, the box M containing the various scales and correction elements, is shown with the lid opened. The box is made most preferably of dull varnished aluminum plate. Upon the inner face of the cover N is secured the device for reading corrected values. The device conveniently consists of the following parts:

The disk P with scale or dial S which is a replica of the direction-finder scale of the radio receiver is firmly fixed in the cover. The diameter passing through 0 and 180 degrees thus represents the longitudinal axis of the aircraft. Inside this disk, and concentric therewith, is arranged a rotatable disk K which also bears a graduation and which represents the compass scale. Also these two disks could be made of aluminum sheet. In order to read the corrections of the magnetic deviation, there serves a curve $d$ fixed underneath the disk K, the element of which being visible through the slot T of the disk furnishes the necessary correction to be read on the scale indicated marginally of the slot. To represent the position of the radio direction-finding index there is provided a transparent rotatable strip $s'$ with indicator mark Z. The necessary corrections for quadrantal errors are indicated by the fixed curved line $f$ which is drawn and arranged so as to be visible through the slot V of strip S', by referring to that portion of the curve $f$ which appears through the slot V with the scale indicator on the left hand edge of slot V the readings of the necessary corrections are then readily ascertained.

In an outfit for computation as just described, for instance, at some suitable place of disk K, there may be provided a scale as required for the use of Mercator maps in order to make changes from orthodromic to loxodromic directions.

The necessary wind tabulations could be fixed upon the inner wall of the bottom part B, though a preferable plan would be to place them upon a separate sheet-metal plate O hinged at $q$, $q$. The wind tabulations, for instance, could be arranged in such a way that each table, for a definite actual speed of the vessel or aircraft and different speeds of the wind and directions of the wind in reference to the aircraft would contain both the angles between the axis of the aircraft to the course to be observed and maintained, in moving along the course as well as the variations in speed caused by the effect of wind. Another recommendable plan would be to provide on this plate a schedule tabulation which will permit to read the time required to cover given distances at a definite rate of speed. Blank space should be suitably reserved on the same plate for notes to be made in order to relieve the memory and mind of the operator of the outfit on each trip. These notes, for example, may relate to the course on the map to be kept, further to the magnetic variations prevailing in the region through which the aircraft is passing, to the deviation of the aircraft compass in use, to the angle of leeway to be observed in order to compensate for the drift caused by the wind, to the resultant course, to the wind direction and velocity, to the time, to the beacons to be used for direction-finding as well as their wave-length and working periods, etc.

Upon the bottom of the apparatus, in other words, under the panel O in the embodiment illustrated in Figs. 1 and 2, there is accommodated the means used for evaluating the direction-finder results on the map. Fig. 3 shows the above-mentioned means which consists of a transparent plate $a$ with a number of meridian lines $b$. Fig. 4 shows an angle protractor $c$ the extension $f'$ of which forms a ruler.

With the aid of this transparent plate and angle protractor C the position of the aircraft can be quickly found on Mercator and orthodromic charts after having taken two or more bearings. Nine holes are provided on the plate for inserting the ruler. It is guided according to the direction in which the bearings have been taken. For instance, the left middle hole is used for bearings in the direction East, and the left upper hole is used for bearings from direction South-East. For example, if the true bearing of a transmitter is found to be 32°, that of a second transmitter is found to be 156° with an orthodromic chart or conical projection placed below the transparent plate $a$, insert the nipple of the ruler into the middle, adjust the ruler $f'$ in a way that the left red line of the plate will coincide above with the 32° division of the ruler scale and thereupon draw a line on the plate along the ruler with the aid of a lead pencil; then draw a second line on the plate as soon as the left red line coincides with 156°. Now put the plate without ruler on the chart and shift the plate until the left red line is parallel to the meridian through the point at which the two lead pencil lines intersect, and until these two lines are passing through the places of the respective transmitters. The position of the aircraft can be marked on the chart with a lead pencil which must be put through the hole of the plate. The lines drawn on the plate can be erased with soft rubber; the plate is also not chemically affected by benzine and alcohol.

If it is desired to omit the local magnetic variation when fixing the position of the aircraft, the magnetic variation should previously be marked on the chart with red lines at as many places as possible, in this case the position finding plate must be laid on the chart in such a way that the red line of the plate, instead of running parallel with the meridian through the place, is now parallel to the nearest line of magnetic variation.

I claim:

1. A mechanical evaluation device for directional receiving apparatus comprising a box-like member having fixed thereto a scale, said scale being graduated in degrees similar to the direction finder scale on the receiving apparatus, a rotatable disc concentrically arranged with said scale having graduation similar to a compass scale, a radial slot in said disk, graduations on the edge of said slot for reading magnetic corrections from a curve on said scale and appearing through said radial slot, a transparent rotatable strip pivotally fixed to the center of said fixed scale and rotatable disc, and arranged to indicate corrections marked on said fixed scale.

2. An evaluation device for direction finder receiving apparatus comprising a fixed member having a scale graduated in degrees similar to the direction finder scale of said receiving apparatus, a rotatable disc secured to said scale, said rotatable disc having graduations similar to a compass scale, a radial slot in said disc, graduations on the edge of said slot for reading magnetic corrections from a curve on said scale and appearing through said radial slot, a rotatable strip pivotally fixed to the center of said scale and said rotatable disc, a graduated index on said strip for reading direction finder corrections appearing in the form of a curve on the face of said scale.

3. An evaluation device for direction finder receiving apparatus located on aircraft comprising a fixed member having a scale graduated in degrees similar to the direction finder scale of said receiving apparatus, the diameter passing through zero to 180° representing the longitudinal axis of said aircraft, a rotatable disc secured to said scale, said rotatable disc having graduations similar to a compass scale, a radial slot in said disc graduations on the edge of said slot for reading magnetic corrections from a curve on said scale and appearing through said radial slot, a rotatable strip pivotally fixed to the center of said scale and said rotatable disc, a graduated index on said strip for reading direction finder corrections appearing in the form of a curve on the face of said scale.

4. An evaluation device for direction finder receiving apparatus located on aircraft comprising a fixed member having a scale of sheet aluminum graduated in degrees similar to the direction finder scale of said receiving apparatus, the diameter passing through zero to 180° representing the longitudinal axis of said aircraft, a rotatable disc of sheet aluminum secured to said scale, said rotatable disc having graduations similar to a compass scale, a radial slot in said disc graduations on the edge of said slot for reading magnetic corrections from a curve on said scale and appearing through said radial slot, a rotatable strip pivotally fixed to the center of said scale and said rotatable disc, a graduated index on said strip for reading direction finder corrections appearing in the form of a curve on the face of said scale.

5. An evaluation device for direction finder receiving apparatus, comprising a fixed member having an aperture therein, a disk-like scale secured to said fixed member, graduations on said scale similar to the direction finder scale of said receiving apparatus, an index on said fixed member, a rotatable disk having a pivot member secured to said fixed member, said rotatable disk having graduations in degrees similar to a compass scale, a radial slot in said disk, graduations marginally located near said slot, a curve located on said fixed member, a portion of which is visible through said slot, a rotatable strip secured to said pivot located in the center of said rotatable disk, a graduated index on said strip for reading direction finder corrections appearing in the form of a curve on the face of said scale.

6. An evaluation device for direction finder receiving apparatus, comprising a fixed member having an aperture therein, a disk-like scale secured to said fixed member, graduations on said scale similar to the direction finder scale of said receiving apparatus, an index on said fixed member, a rotatable disk having a pivot member secured to said fixed member, said rotatable disk having graduations in degrees similar to a compass scale, a radial slot in said disk, graduations marginally located near said slot, a curve located on said fixed member, a portion of which is visible through said slot, a rotatable and removable strip which is secured to said pivot located in the center of said rotatable disk, a graduated index on said strip for reading direction finder corrections appearing in the form of a curve on the face of said scale.

7. An evaluation device for direction finder receiving apparatus, comprising a fixed member having an aperture therein, a disk-like scale secured to said fixed member, graduations on said scale similar to the direction finder scale of said receiving apparatus, an index on said fixed member, a rotatable disk having a pivot member secured to said fixed member, said rotatable disk having graduations in degrees similar to a compass scale, a radial slot in said disk, graduations marginally located near said slot, a curve located on said fixed member, a portion of which is visible through said slot, a rotatable and removable strip which is secured to said pivot located in the center of said rotatable disk, a graduated index on said strip for reading direction finder corrections appearing in the form of a curve on the face of said scale, and a second removable strip, the central portion of which forms a protractor-like element, said second removable strip to be substituted for said first-mentioned removable strip for evaluating the direction finder results on a map.

HANS SCHARLAU.